United States Patent
Chaiken et al.

(10) Patent No.: US 7,337,338 B2
(45) Date of Patent: Feb. 26, 2008

(54) INFORMATION HANDLING SYSTEM CAPABLE OF OPERATION IN REDUCED POWER STATES

(75) Inventors: Craig Chaiken, Pflugerville, TX (US); Muhammed K. Jaber, Round Rock, TX (US); Adolfo S. Montero, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 517 days.

(21) Appl. No.: 10/759,640

(22) Filed: Jan. 16, 2004

(65) Prior Publication Data
US 2005/0198417 A1    Sep. 8, 2005

(51) Int. Cl.
*G06F 1/32* (2006.01)
(52) U.S. Cl. ...................................... 713/320
(58) Field of Classification Search ................. 713/320
See application file for complete search history.

(56) References Cited

U.S. PATENT DOCUMENTS

| | | | |
|---|---|---|---|
| 5,471,625 A * | 11/1995 | Mussemann et al. | 713/322 |
| 5,652,895 A * | 7/1997 | Poisner | 713/322 |
| 6,347,202 B1 * | 2/2002 | Shishizuka et al. | 399/75 |
| 6,678,831 B1 | 1/2004 | Mustafa et al. | |
| 6,708,278 B2 * | 3/2004 | Howard et al. | 713/323 |
| 6,711,691 B1 | 3/2004 | Howard et al. | |
| 7,155,618 B2 * | 12/2006 | Moyer et al. | 713/320 |
| 7,159,766 B2 * | 1/2007 | Wurzburg et al. | 235/376 |

OTHER PUBLICATIONS

Fleming, Kris, *Intel-Power Saving of Using USB Selective Suspend Support Whitepaper*, Version 0.6, May 20, 2003.

* cited by examiner

*Primary Examiner*—Rehana Perveen
*Assistant Examiner*—Eric Chang
(74) *Attorney, Agent, or Firm*—Haynes and Boone, LLP

(57) ABSTRACT

A method and system for allowing a processor to enter low power states in an information handling system (IHS) include detecting an access request for a bus mastering device. The method and system also include in response to failing to detect an access request for the bus mastering device within a period of time, suspending a bus mastering device controller associated with the bus mastering device, wherein the now suspended bus mastering controller no longer prevents the processor from entering low power states.

27 Claims, 4 Drawing Sheets

INFORMATION HANDLING SYSTEM CAPABLE OF OPERATION IN REDUCED POWER STATES

BACKGROUND

The present disclosure relates generally to information handling systems (IHS's), and more particularly to information handling systems which feature reduced power consumption.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As power conservation is an ever present issue, many modern IHS's are designed with power savings features. A common method used in IHS's to achieve lower power usage is to configure IHS's and components with multiple power states. For example, according to the current Advanced Configuration and Power Interface (ACPI) standard, a typical IHS may enter into power savings states ranging from S0 (full on) to S4 (hibernate). More relevant to this disclosure, Intel Architecture based processors may operate in various power savings states known as "C states", ranging from C0 (full power-least power saving state) to C4 (highest power saving state). Because "C States" higher than C2 present significantly greater power savings, it would be desirable for processors to operate in C3 and higher states whenever possible.

IHS's which feature bus mastering components present significant hurdles to achieving C3 and higher power savings states because any bus mastering activity prevents processors from entering C3 and higher states. One example of a type of component which utilizes bus mastering is a Universal Serial Bus (USB) component. USB component's prevalence in modern IHS's presents an acute challenge in designing more power efficient IHS's.

Some existing USB devices support power savings states through what is known as "selective-suspend." "Selective-suspend" allows USB hubs to be suspended if no devices are connected to the hub. In addition, if only suspended USB devices are connected to a USB controller, the controller may also be suspended. Therefore, IHS's equipped with only "selective-suspend" compliant USB devices may operate with their processors in C3 and higher states. However, many USB devices do not support "selective-suspend." This is especially true for USB storage devices.

Therefore, what is needed is a technique for enabling an IHS equipped with a bus mastering device, such as a non selective-suspend compliant USB device, to operate with its processor in enhanced power savings states such as C3 and higher states to reduce power consumption.

SUMMARY

Accordingly, in one embodiment, a method for allowing a processor to enter low power states in an IHS is disclosed which includes detecting an access request for a bus mastering device. The method also includes in response to failing to detect an access request for the bus mastering device within a predetermined period of time, suspending a bus mastering device controller associated with the bus mastering device, wherein the now suspended bus mastering controller no longer prevents the processor from entering low power states.

In another embodiment, an information handling system (IHS) is disclosed which includes a processor capable of entering low power states. The IHS includes a memory coupled to the processor and a non-volatile storage coupled to the processor. The IHS also includes a bus mastering device and a bus mastering device controller coupled to the bus mastering device and the processor for transferring information between the bus mastering device and the processor. Executable code is stored in the non-volatile storage for detecting an access request for the bus mastering device and causing the bus mastering device controller to be suspended in response to failing to detect an access request for the bus mastering device within a predetermined period of time, wherein the now suspended controller no longer prevents the processor from entering low power states.

A principal advantage of the embodiment disclosed herein is that the IHS can operate with its processor in low power states, resulting in reduction in power consumption.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
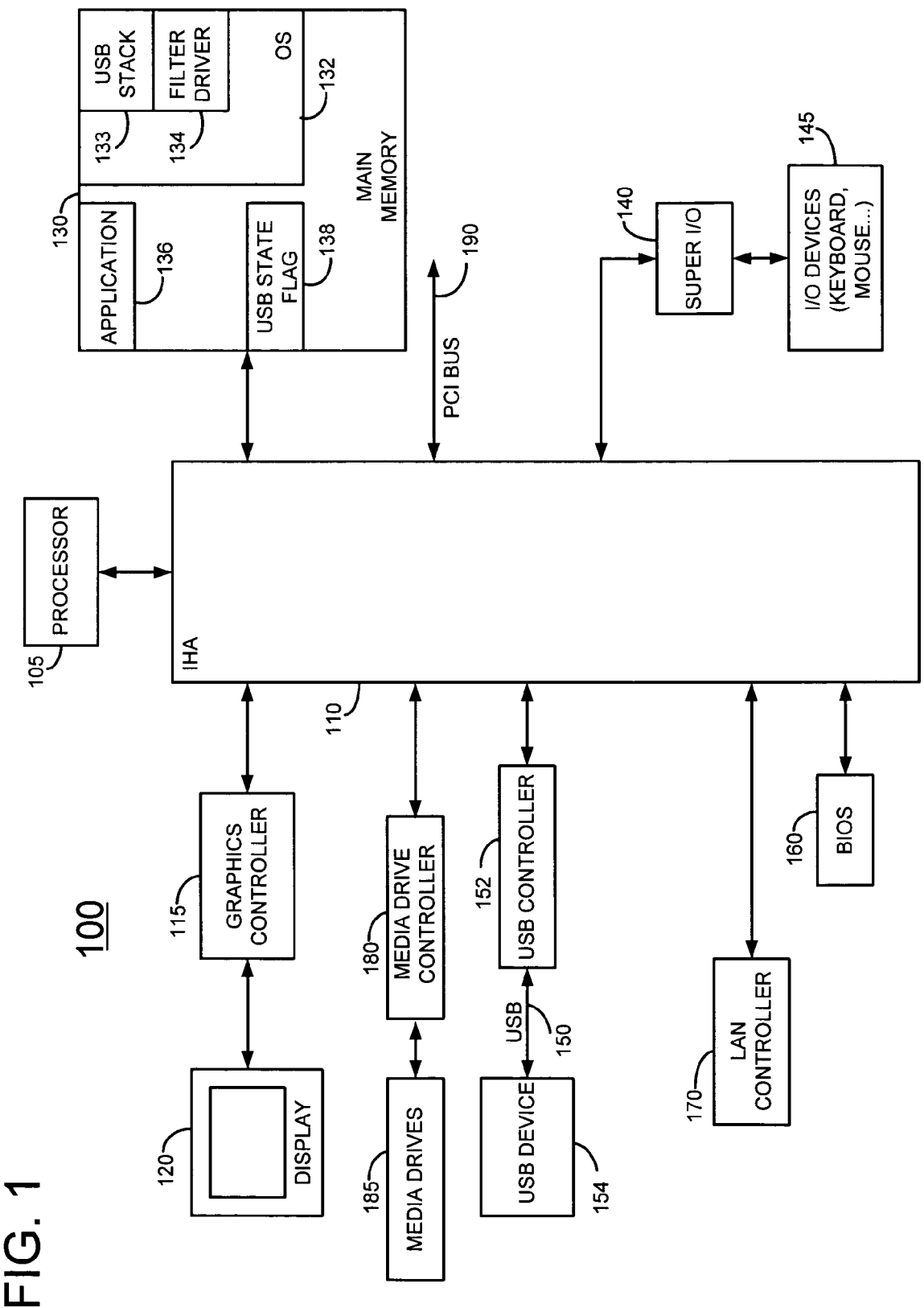
FIG. 1 is a block diagram of an embodiment of the disclosed information handling system.

In one embodiment, information handling system 100, FIG. 1, includes a processor 105 such as an Intel Pentium series processor. Processor 105 is capable of operating in one of the above mentioned "C states" to conserve power. An Intel Hub Architecture (IHA) chipset 110 provides IHS system 100 with graphics/memory controller hub functions and I/O functions. More specifically, IHA chipset 110 acts as a host controller which communicates with a graphics controller 115 coupled thereto. A display 120 is coupled to graphics controller 115. Chipset 110 further acts as a controller for main memory 130 which is coupled thereto. Chipset 110 also acts as an I/O controller hub (ICH) which performs I/O functions. A super input/output (I/O) controller 140 is coupled to chipset 110 to provide communications between chipset 110 and input devices 145 such as a mouse, keyboard, and tablet, for example. A USB controller 152 is coupled to chipset 110 so that devices such as a USB device 154 can be connected to chipset 110 and processor 105. USB device 154 is coupled to USB controller 152 via USB 150. USB devices that may be coupled to USB controller 152 include floppy disk drives, CD-ROM drives, DVD-ROM drives and other devices which support the USB standard. System basic input-output system (BIOS) 160 is coupled to chipset 110 as shown. BIOS 160 is stored in CMOS or FLASH memory so that it is nonvolatile.

A local area network (LAN) controller 170, alternatively called a network interface controller (NIC), is coupled to chipset 110 to facilitate connection of system 100 to other information handling systems. Media driver controller 180 is coupled to chipset 110 so that devices such as media drives 185 can be connected to chipset 110 and processor 105. Devices that can be coupled to media controller 180 include CD-ROM drives, DVD drives, hard disk drives and other fixed or removable media drives. An expansion bus 190, such as a peripheral component interconnect (PCI) bus, PCI Express bus, serial advanced technology attachment (SATA) bus or other bus is coupled to chipset 110 as shown. Expansion bus 190 includes one or more expansion slots (not shown) for receiving expansion cards which provide IHS 100 with additional functionality.

USB 150, USB controller 152, and USB device 154 feature bus mastering. USB device 154 is an example of a bus mastering device and USB controller 152 is an example of a bus mastering device controller. As discussed earlier, in conventional systems, any bus mastering activity prevents processor 105 from being placed into states C3 and higher. Also as mentioned above, although "selective suspend" allows some USB equipped IHS's to place their processors in C3 and higher states, all USB devices in an IHS must support "selective suspend" in order for this feature to operate. Here, USB device 154 is not a "selective suspend" compliant device. To remedy the power issue related to devices featuring bus mastering, and particularly in this embodiment with USB devices, IHS 100 includes additional features as described herein.

While IHS 100 is actively operational, an application 136 is loaded in main memory 130. Application 136 may be a word processing application, graphics editor, or any other available software application. Also loaded in main memory 130 is an operating system (OS) 132, such as one of Microsoft Windows family of operating systems. (Microsoft and Windows are trademarks of Microsoft Corp.). In this embodiment, OS 132 includes a USB stack 133 and a filter driver 134 which is stored in the form of executable code. Main memory further includes a USB state flag 138. Although USB state flag 138 is shown to be loaded in main memory 130 here, in other embodiments, USB state flag may be stored in other types of volatile and non-volatile storage devices such as media drives 185 or BIOS 160.

Figure 2A:
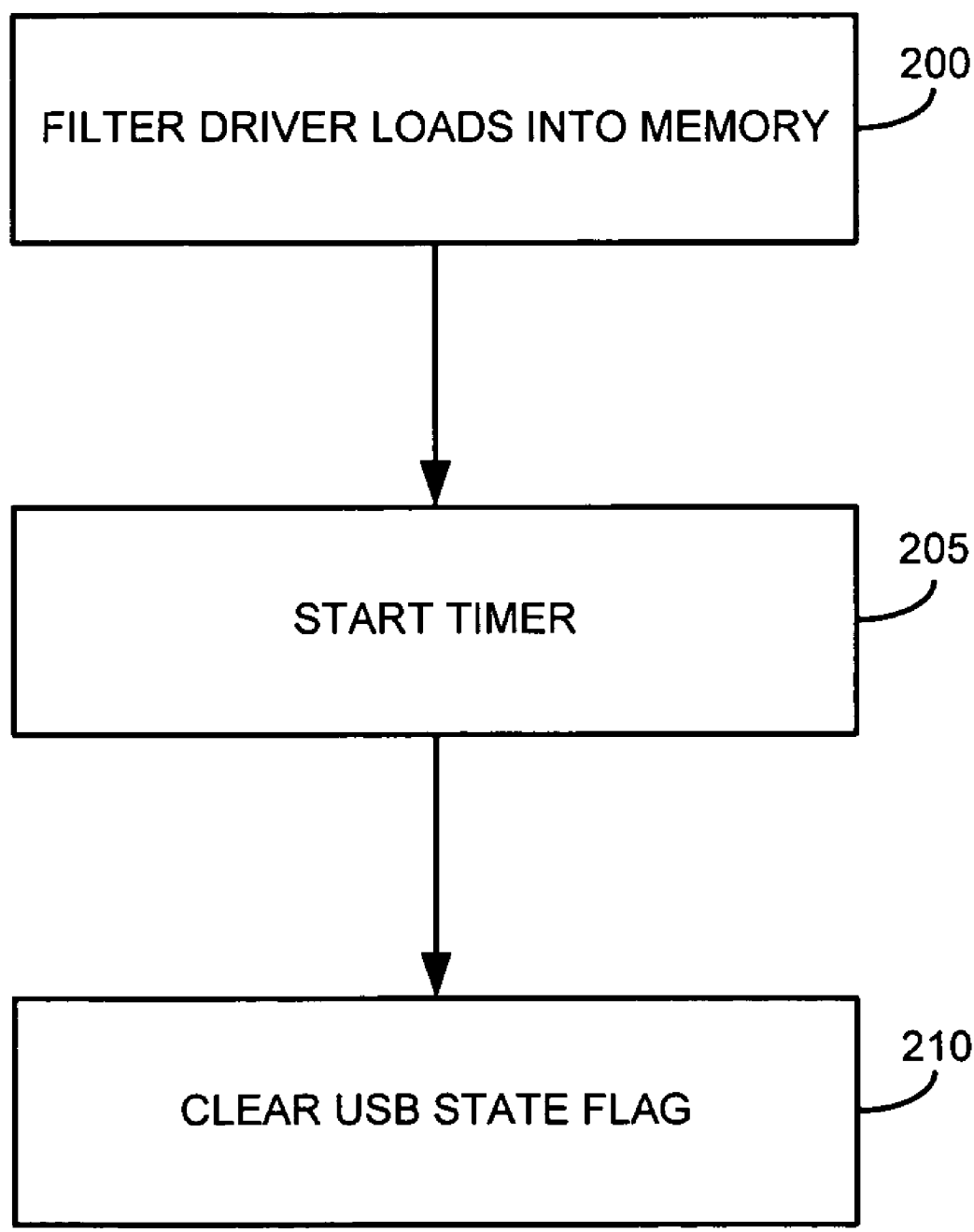
FIG. 2A is a flow chart showing the filter driver initialization process in the information handling system of FIG. 1.
Figure 2B:
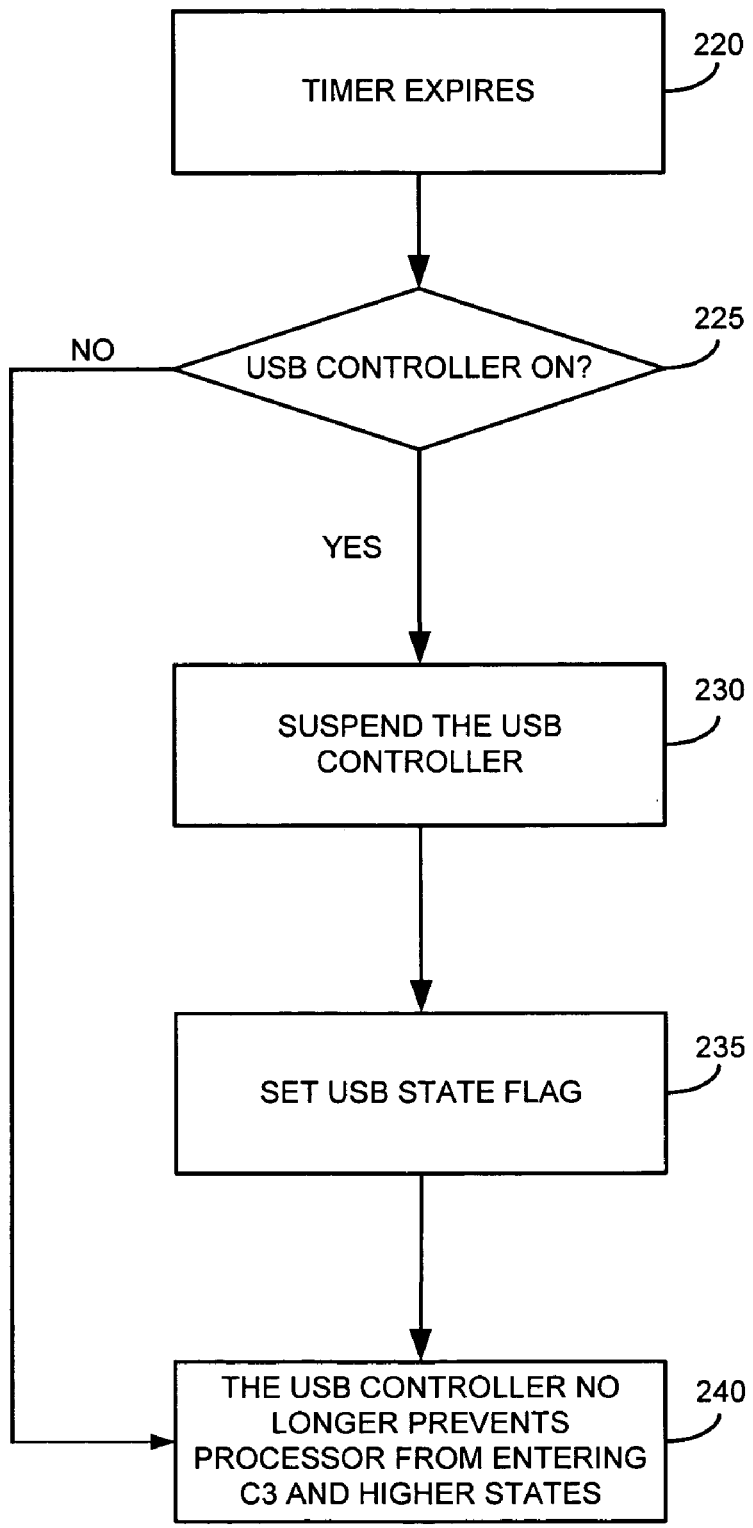
FIG. 2B is a flow chart showing the process flow of suspending the USB controller in the information handling system of FIG. 1.
Figure 2C:
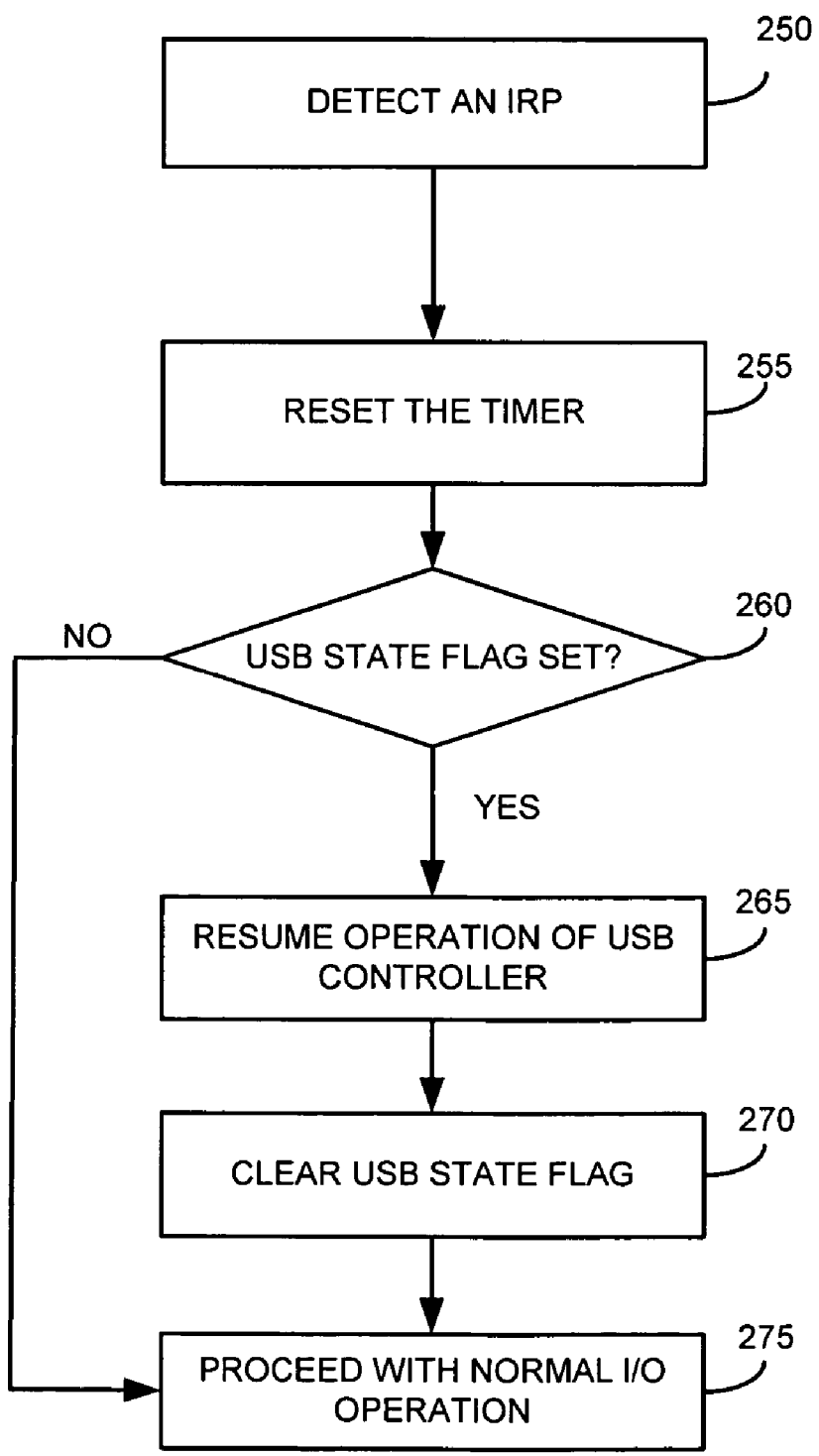
FIG. 2C is a flow chart showing the process flow of resuming operation of the USB controller in the information handling system of FIG. 1.

Operation of IHS 100 may be seen by examining FIGS. 2A, 2B, and 2C. FIG. 2A is a flow chart depicting process flow that occurs when filter driver 134 initializes. In block 200, filter driver 134 is loaded into main memory 130. Subsequently in block 205, filter driver 134 starts a timer (not shown) for a period of time. The period of time represents an amount of time that USB controller 152 may remain inactive before a process to suspend USB controller 152 initiates. For example, the timer may be set for 10 seconds, and if USB controller 152 remains inactive for 10 seconds, a process will begin to suspend USB controller 152. In block 210, filter driver 134 clears USB state flag 138. USB state flag 138 may either be cleared which is its default state, or in the alternative, set. Functions of USB state flag 138 as well as the timer are discussed in more detail later in this disclosure.

FIG. 2B is a flow chart illustrating the steps IHS 100 takes to suspend USB controller 152 in the event the aforementioned timer expires. As discussed above, the timer expires if USB controller 152 remains inactive for the period of time for which the timer is set. IHS 100 may be configured to detect USB controller 152's inactivity in a number of different ways. In this particular embodiment, the executable code of filter driver 134 is configured to monitor input/output request packets (IRP's) generated for USB controller 152. IRP's are generated by OS 132 in response to requests made by OS 132 itself or by application 136, to transmit or receive information to or from devices coupled to USB controller 152, such as USB device 154. Using a word processing application and a floppy disk drive as examples of application 136 and USB device 154, respectively, when an IHS user issues a command to save a document to a disk inserted into the floppy disk drive, the word processing application causes OS 132 to generate an IRP in performing the task. IRP's are then transmitted to USB stack 133 for further processing. While in transmission, IRP's are detected by filter driver 134. As discussed in more detail later, detection of IRP's by filter driver 134 indicates that USB controller 152 is currently active, and the timer is restarted. Of course, restarting the timer prevents it from expiring.

If filter driver 134 fails to detect an IRP during the period of time as set by the timer, the timer expires. In the event that the timer expires as shown in block 220, filter driver 134 determines whether USB controller 152 is currently on (i.e., not suspended) as shown in decision block 225. If filter driver 134 determines that USB controller 152 is currently not in suspend mode, filter driver 134 causes USB controller 152 to be placed into suspend mode as shown in block 230. Various implementations are possible to cause USB controller 152 to be placed into suspend mode. In one particular embodiment, filter driver 134 may cause a system management interrupt (SMI) to be generated, which in turn places USB controller 152 into suspend mode. In addition, filter driver 134 may similarly place USB device 154 into suspend mode prior to placing controller 152 into suspend mode.

As shown in block 235, filter driver 134 also sets USB state flag 138. As mentioned earlier, USB state flag 138 may be set or in the alternative, cleared. When USB flag 138 is set, it functions as an indication that USB controller 152 is suspended and that when filter driver 134 needs to resume operation of controller 152 (for example, because it now detects an IRP destined for USB controller 152), it is permitted to do so. Essentially, setting USB flag 138 is an indication that filter driver 134 and not another component of IHS 100 caused USB controller 152 to be placed into suspend mode. In the present disclosure, USB controller 152 is placed into suspend mode by filter driver 134. However, in the course of IHS 100's operation, controller 152 may be placed into suspend mode by various other components of IHS 100, such as other components of OS 132. It is desirable to prevent filter driver 134 from resuming operation of USB controller 152 that has been placed into suspend mode by another component of IHS 100. Accordingly, when the time arrives for resuming operation of USB controller 152, USB state flag 138 aids filter driver 138 in distinguishing between situations where it may perform the operation (when it is set), and situations where it must defer (when it is cleared) to the component which originally placed controller 152 into suspend mode. The process of resuming operation of controller 152 is discussed in more detail later in this disclosure.

At the completion of above procedures, USB controller 152, now suspended, no longer prevents processor 105 from entering into C3 and higher states, as shown in block 240. Placing USB controller 152 into suspend mode stops bus mastering activities normally engaged by controller 152. Note that if the test conducted at decision block 225 determines that USB controller 152 is already in suspend mode, then the above steps are skipped as shown in FIG. 2B and the flow directly continues to block 240.

FIG. 2C is a flow chart describing the process flow of resuming operation of USB controller 152. The process is initiated when OS 132 generates an IRP for USB controller 152 during the period of time in which the timer has not expired. As shown in block 250, the IRP is detected, and in this particular embodiment, filter driver 134 performs the detection. Detection of the IRP by filter driver 134 indicates a new activity, and filter driver 134 restarts the timer for the period time as illustrated in block 255 to begin measuring time of inactivity anew.

In decision block 260, a test is conducted to determine whether USB state flag 138 is set. As noted earlier, when USB state flag is set, it is an indication that USB controller 152 is currently in suspend mode. It is also an indication that filter driver 134 and not another component of IHS 100 caused USB controller 152 to be placed into suspend mode. Consequently, if it is determined that USB state flag 138 is in fact set, filter driver 134 takes the necessary steps to resume operation of USB controller 152 as shown in block 270. In one embodiment, resuming operation of controller 152 is performed by filter driver 134 by generating a SMI, which in turn actually resumes operation of controller 152. Additionally, resuming operation of controller 152 may include resuming operation of USB device 154 coupled to controller 152. If an alternative outcome is reached in decision block 260 and USB state flag 138 is not set, then it is an indication that controller 152 was placed into suspend mode by another component of IHS 100 or that it was not placed into suspend mode at all. Accordingly, the flow continues directly to block 275 where IHS 100 proceeds with normal input/output (I/O) operation as shown, relying on another component as necessary to resume operation of USB controller 152 if controller 152 was placed in suspend mode by the other component.

Once filter driver 134 resumes operation of USB controller 152 in block 265, filter driver 134 clears USB state flag 138 as shown in block 270 to indicate that controller 152 is currently not in suspend mode. Finally, IHS 100 proceeds with normal I/O operation as shown in block 275.

Note that in the above discussion, a number of functions related to detecting IRP's, placing USB controller 152 into suspend mode, resuming operation of controller 152, and other aspects of present disclosure are incorporated into filter driver 134. However, in another embodiment, functions described therein may be performed by any one or more software components and/or hardware components so configured.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method for allowing a processor to enter low power states in an information handling system (IHS), the method comprising:
    coupling a bus mastering device to a bus mastering device controller via a bus;
    coupling the bus mastering device controller to an IHS;
    detecting an access request for the bus mastering device, wherein the detecting is performed by a processor of the IHS; and
    in response to failing to detect an access request for the bus mastering device within a predetermined period of time, suspending the bus mastering device controller associated with the bus mastering device, wherein the now suspended controller no longer prevents the processor from entering low power states.

2. The method of claim 1 further comprising:
    starting a timer for the predetermined period of time; and
    in response to failing to detect an access request for the period of time, expiring the timer, wherein suspending the bus mastering device controller is performed in response to the timer expiring.

3. The method of claim 2 further comprising:
    in response to detecting an access request for the bus mastering device, restarting the timer for the predetermined period of time.

4. The method of claim 3 further comprising:
    in response to detecting an access request for the bus mastering device, also resuming operation of the bus mastering device controller if the bus mastering device controller has been suspended.

5. The method of claim 1 wherein detecting an access request for the bus mastering device includes detecting an input/output request packet (IRP).

6. The method of claim 4, wherein detecting an access request for the bus mastering device, starting the timer for the predetermined period of time, and resuming the operation of the bus mastering device controller are performed in response to an executable code executable by the IHS.

7. The method of claim 6, wherein the executable code is a filter driver.

8. The method of claim 6 further comprising:
    in conjunction with suspending the bus mastering device controller, selling a flag indicating that the bus mastering device controller has been suspended in response to the IHS executing the executable code;

resuming operation of the bus mastering device controller if the flag is set and there is an access request for the bus mastering device; and clearing the flag.

9. The method of claim 1, wherein a system management interrupt (SMI) performs suspending the bus mastering device controller.

10. The method of claim 1, wherein the bus mastering device is a universal serial bus (USB) device and the bus mastering device controller is a USB device controller.

11. The method of claim 10, wherein the USB device includes a USB storage device.

12. The method of claim 11, wherein the USB storage device includes a floppy disk drive.

13. The method of claim 11, wherein the USB storage device includes an optical disk drive.

14. An information handling system (IHS) comprising:
a processor capable of entering low power states,
a memory coupled to the processor;
a non-volatile storage, coupled to the processor;
a bus mastering device;
a bus mastering device controller coupled to the bus mastering device via a bus, wherein the bus mastering device controller is coupled to the processor, and wherein the bus mastering device controller is for transferring information between the bus mastering device and the processor; and
an executable code stored in the non-volatile storage for detecting an access request for the bus mastering device and causing the bus mastering device controller to be suspended in response to failing to detect an access request for the bus mastering device within a predetermined period of time, wherein the now suspended controller no longer prevents the processor from entering low power states.

15. The IHS of claim 14, wherein the executable code starts a timer for the predetermined period of time, expires the timer in response to failing to detect an access request for the bus mastering device within the time period, and wherein causing the bus mastering device controller to be suspended is in response to the timer expiring.

16. The IHS of claim 15, wherein the executable code restarts the timer for the predetermined period of time in response to detecting an access request for the bus mastering device.

17. The IHS of claim 16, wherein the executable code further causes the bus mastering device controller to resume operation in response to detecting an access request for the bus mastering device, if the bus mastering device controller has been suspended.

18. The IHS of claim 14, wherein detecting an access request for the bus mastering device includes detecting an input/output request packet (IRP).

19. The IHS of claim 14, wherein the process includes a filter driver.

20. The IHS of claim 17, wherein the executable code further comprises:

in conjunction with causing the bus mastering device controller to be suspended, setting a flag indicating that the bus mastering device controller has been suspended in response to the IHS executing the executable code;

resuming operation of the bus mastering device controller if the flag is set when there is an access request for the bus mastering device; and clearing the flag.

21. The IHS of claim 14, wherein the executable code causes the bus mastering device controller to be suspended by generating a system management interrupt (SMI).

22. The IHS of claim 14, wherein the bus mastering device is a universal serial bus (USB) device and the bus mastering device controller is a USB device controller.

23. The IHS of claim 22, wherein the USB device includes a USB storage device.

24. The IHS of claim 23, wherein the USB storage device includes a floppy disk drive.

25. The IHS of claim 23, wherein the USB storage device includes an optical disk drive.

26. An information handling system (IHS) comprising:
a processor capable of entering low power states
a non-volatile storage, coupled to the processor;
a bus mastering device;
controller means coupled to the bus mastering device via a bus, wherein the controller means is coupled to the processor, and wherein the controller means is for transferring information between the bus mastering device and the processor and limiting the processor from entering low power states; and
storing means in the non-volatile storage for detecting an access request for the bus mastering device and causing the controller means to be suspended in response to failing to detect an access request for the bus mastering device within a predetermined period of time, wherein the now suspended controller means no longer limits the processor from entering low power states.

27. A method for allowing a processor to enter low power states in an information handling system (IHS) comprising:
providing a processor capable of entering low power states,
coupling a non-volatile storage to the processor;
providing a bus mastering device;
coupling a controller means to the bus mastering device via a bus, wherein the controller means is coupled to the processor, and wherein the controller means is for transferring information between the bus mastering device and the processor and limiting the processor from entering low power states; and
storing means in the non-volatile storage for detecting an access request for the bus mastering device and causing the controller means to be suspended in response to failing to detect an access request for the bus mastering device within a predetermined period of time, wherein the now suspended controller means no longer limits the processor from entering low power states.

* * * * *

UNITED STATES PATENT AND TRADEMARK OFFICE
CERTIFICATE OF CORRECTION

| | |
|---|---|
| PATENT NO. | : 7,337,338 B2 |
| APPLICATION NO. | : 10/759640 |
| DATED | : February 26, 2008 |
| INVENTOR(S) | : Craig Chaiken et al. |

Page 1 of 1

It is certified that error appears in the above-identified patent and that said Letters Patent is hereby corrected as shown below:

Claim 26, Column 8, Line 30, delete "storing means" and insert --means stored--.

Signed and Sealed this

Ninth Day of December, 2008

JON W. DUDAS
*Director of the United States Patent and Trademark Office*